Jan. 16, 1951 H. A. OLANDER 2,538,426
CHEESE-CUTTING DEVICE
Filed Jan. 14, 1948 2 Sheets-Sheet 1
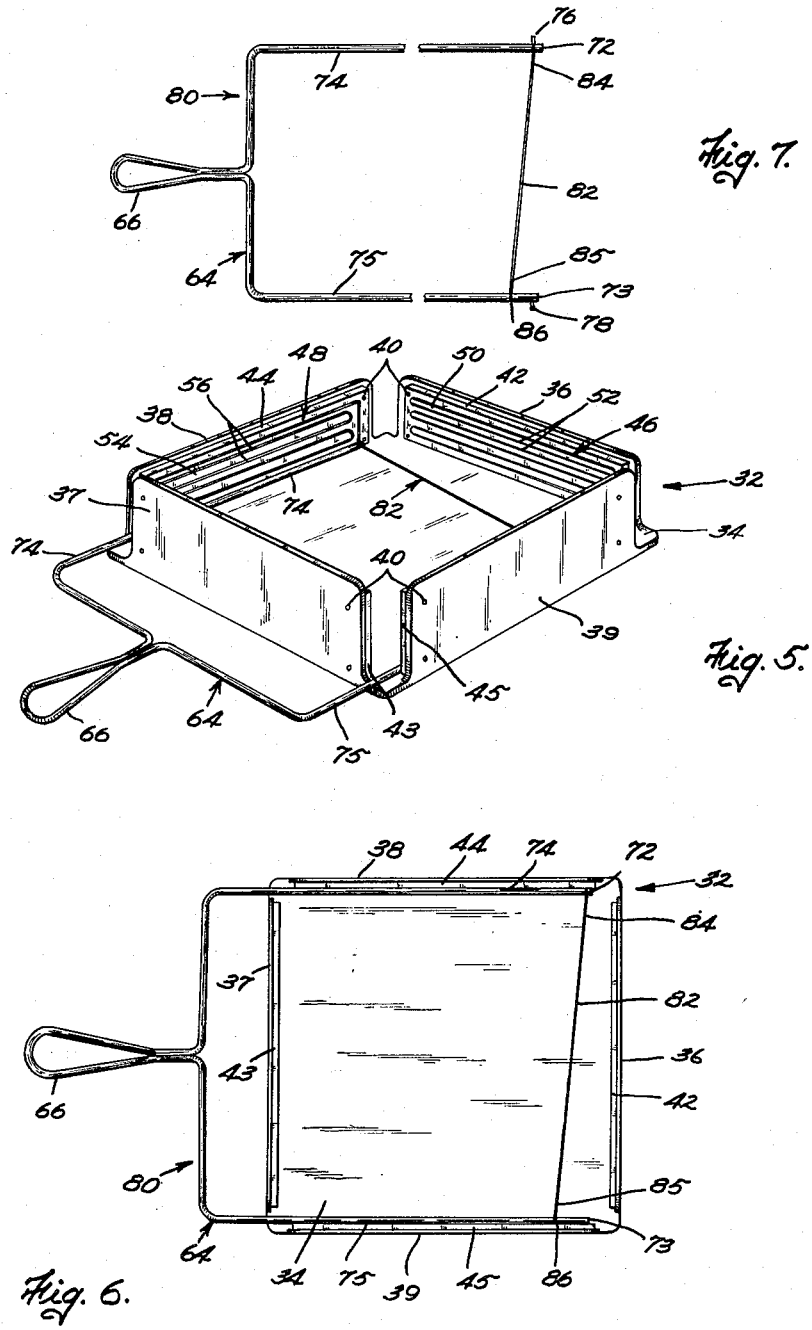
INVENTOR.
Harold A. Olander
BY Thiess, Olson, & Mecklenburger
ATT'ys

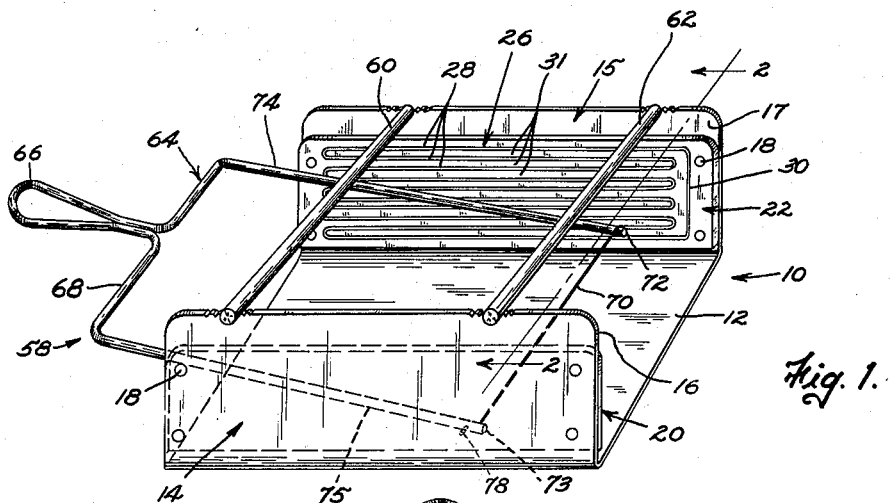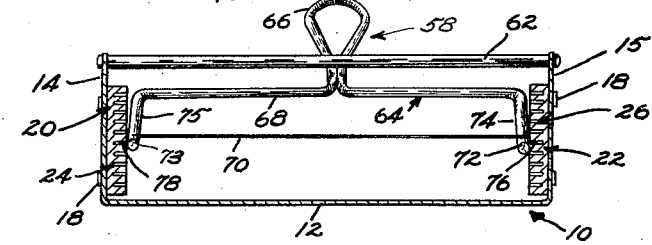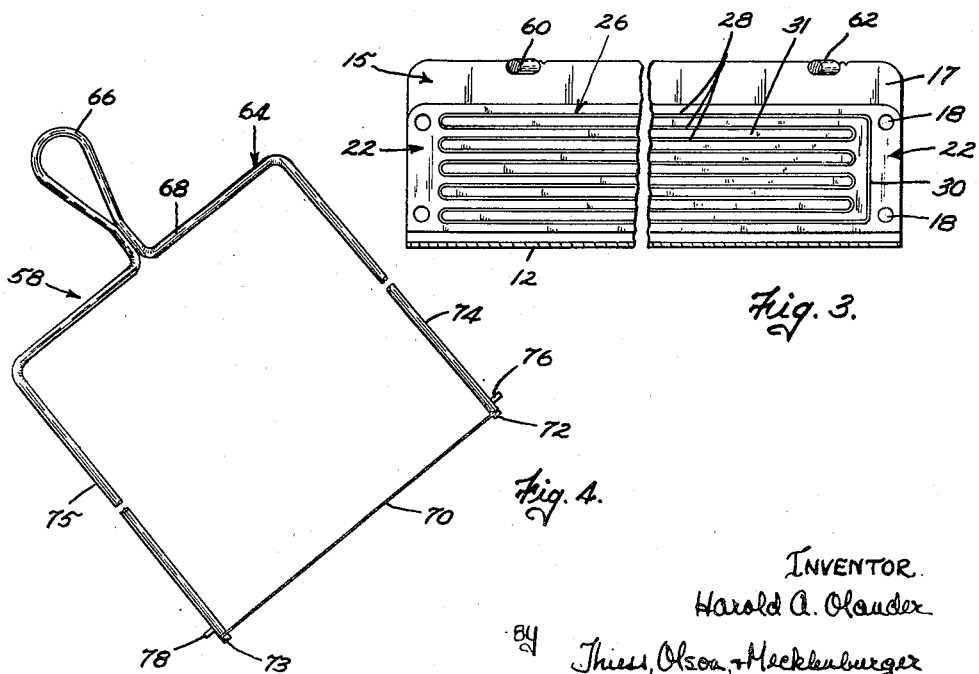

Patented Jan. 16, 1951

2,538,426

UNITED STATES PATENT OFFICE 2,538,426

CHEESE-CUTTING DEVICE

Harold A. Olander, Chicago, Ill.

Application January 14, 1948, Serial No. 2,218

19 Claims. (Cl. 31—25)

This invention relates to cutting devices and more particularly to a small inexpensive device for cutting cheese and the like.

Various cheese cutting devices have heretofore been proposed which are either too bulky and awkward to handle or so costly as to exceed the housewife's budget. It is frequently desirable to purchase cheese in bulk form, such as a brick or loaf, at a considerable saving on the purchase price and also thereby to guarantee freshly cut cheese at all times.

Thus it is one of the objects of this invention to provide a cutting device for cheese and the like which is compact in construction, durable and simple in operation, and inexpensive to produce, thereby rendering it a practical and attractive device for home use.

It is a further object of this invention to provide a cutting device for cheese and the like whereby a loaf or brick of cheese may readily be cut into a plurality of slices of uniform thickness.

Further and additional objects will appear from the description, accompanying drawings, and appended claims.

In accordance with one embodiment of this invention a holder is provided having a base with a pair of parallel, vertically extending sides, a pair of guide members attached to the opposing faces of said sides and having like tortuous slots cut therein, and a pair of positioning rods angularly disposed between said sides and attached thereto. Each tortuous slot comprises a plurality of horizontal, parallel sections serially connected, and the uppermost and lowermost horizontal sections are connected by a vertical section. The spacing between the horizontal parallel sections is uniform, thus assuring slices of uniform thickness. Cooperating with the holder is a cutting instrument comprising a wirelike blade tautly held between the ends of the arms of a U-shaped frame and stud-like elements extending outwardly at the ends of said arms for slidably engaging with the tortuous slots. The frame is slightly less in width than the spacing between the guide members, and its arms have a slight spring outwardly to give the desired tautness to the blade. The frame may become disengaged from the tortuous slots by turning slightly when the stud-like projections are positioned in the vertical slot section.

For a more complete understanding of the invention reference should now be had to the drawings wherein:

Fig. 1 is a perspective view of the holder with the cutting instrument in place and the loaf of cheese removed;

Fig. 2 is a sectional view of the holder and cutting instrument taken along line 2—2 of Fig. 1;

Fig. 3 is a fragmentary sectional view of one half of the holder showing the guide member attached to one of the vertical sides;

Fig. 4 is a fragmentary plan view of the cutting instrument;

Fig. 5 is a perspective view of a modified form of holder and cutting instrument with the loaf of cheese removed;

Fig. 6 is a top plan view of the modified holder and cutting instrument shown in Fig. 5, and Fig. 7 is a fragmentary view of the modified cutting instrument shown in Figs. 5 and 6.

Referring now to the drawings, a holder 10 is provided having a base 12 and a pair of parallel, vertically extending sides 14 and 15. Attached to the inner faces 16 and 17 of the sides 14 and 15, respectively, by riveting 18, or any other suitable means, are guide members 20 and 22 having like tortuous slots 24 and 26 cut therein. Each of the tortuous slots 24 and 26 comprises a plurality of horizontal parallel sections 28, serially connected, and a vertical slot section 30 connecting the uppermost and lowermost horizontal sections. The spacing 31 between the horizontal parallel sections 28 is uniform.

In the modified holder 32 shown in Figs. 5 and 6, a base 34 and two pairs of parallel, vertically extending sides 36—37 and 38—39 are provided. Attached to the inner face of sides 36—37 and 38—39 by riveting 40, or any other suitable means, are guide members 42—43 and 44—45. Each pair of guide members 42—43 and 44—45 has like tortuous slots 46 and 48 respectively cut therein similar to the tortuous slots 24 and 26 described above. The spacing 50 between the horizontal, serially connected, parallel sections 52 of slot 46 is less than the spacing 54 between the horizontal, serially connected, parallel sections 56 of slot 48; thus depending on which pair of slots 46 or 48 used, thick or thin slices may be cut.

Cooperating with the tortuous slots 24 and 26 is a cutting instrument 58, as shown in Figs. 1 and 2, which will be described later.

Attached by crimping, or any other suitable means, to the parallel sides 14 and 15 at their upper edge, and angularly disposed with reference thereto, are two parallel guide rods 60 and 62, as shown in Fig. 1. The guide rods 60 and 62 have a twofold purpose, namely, to act as a stop for the loaf when it is being sliced by the cutting instrument 58, and secondly to hold the loaf of cheese, not shown, resting endwise on the base 12 of the holder 10, in a slightly angularly disposed position with reference to sides 14 and 15 of holder 10 so that only the corner of the cheese loaf will be engaged by cutting instrument 58, at the beginning of its cutting stroke, thereby causing less resistance to be encountered when the cutting instrument 58 is manipulated back and forth across the holder.

Cutting instrument 58, above mentioned, comprises a U-shaped handle or frame 64 having a grippable end 66 projecting rearwardly from the base 68 of said frame. A wire-like blade 70, attached by welding or any other suitable means to the ends 72 and 73 of the arms 74 and 75 of the U-shaped frame 64, is tautly held thereby, because of the slight outward spring of said arms.

Spaced slightly back from the ends 72 and 73 of frame 64 and attached thereto are studs 76 and 78 protruding outwardly in opposite directions in substantially the same plane as the frame itself and which slidably engage tortuous slots 26 and 24 respectively. To enable such engagement of the studs 76 and 78 with tortuous slots 26 and 24 it is, of course, necessary that the width of frame 64 should be slightly less than the spacing between guide members 20 and 22.

In the modified cutting instrument 80 shown in Figs. 5, 6 and 7, the frame 64 is the same as that described for cutting instrument 58. In place of the ends of the blade 70 of cutting instrument 58 being attached to the ends 72 and 73 of the frame 64 at points directly opposite each other, as shown in Fig. 4, the blade 82 of cutting instrument 80 is obliquely disposed with reference to the frame 64, as shown in Figs. 6 and 7— that is to say one end 84 of the blade 82 is attached to the end 72 of the frame at a point slightly in advance of the point 86 at which the other end 85 of the blade 82 is attached to the frame. Thus in place of angularly positioning the loaf of cheese as described above, the same effect is provided by obliquely positioning the blade 82 of the cutting instrument 80 while the loaf is being held in place by the operator so that two of the outer faces of the loaf are substantially parallel to the sides of the holder. The studs 76 and 78 are placed in the same position for either cutting instrument 58 or 80.

The cutting instrument 58 or 80 may be disengaged from the holder 10 by positioning the frame 64 so that the stud-like elements 76 and 78 are caused to engage the vertical slot section 30 and then by turning the frame 64 a quarter turn or less about the grippable end 66 as the axis, the stud-like elements will become disengaged from the slots. After the cutting instrument 58 or 80 is in the starting position—that is, when the stud-like elements 76 and 78 are at the bottom of the vertical slots 30—and the loaf of cheese has been placed upright on the base 12, the cutting instrument 58 is manipulated back and forth across the holder. With each stroke the cutting instrument is moved progressively upward due to the stud-like elements slidably engaging the serially connected, horizontal, parallel, slot sections.

While the loaf of cheese is being cut, the slices are neatly stacked and held in place by the remainder of the uncut loaf. When the cutting instrument has returned to the starting position—that is when the stud-like elements have reached the bottom of the vertical slot 30 again— the uncut loaf of cheese is lifted off and the slices removed.

As seen in Fig. 5, the vertical sides 36, 37, 38, and 39 are shorter in length than the spacing between the arms 74 and 75 of cutting instrument 80. Thus either pair of sides 36—37 or 38—39 may be used, depending on the thickness of the slices desired.

It will be obvious that certain modifications of the specific embodiments shown may be made without departing from the spirit and scope of this invention. For example, guide members 20 and 22 attached to the vertical sides 14 and 15 of holder 10, as shown in Fig. 1, may be of a removable type and replaceable by another pair of guide members having a greater number of horizontal parallel sections and a variance in spacing between the horizontal serially connected sections so as to enable thicker or thinner slices to be cut.

From the foregoing, it will be readily seen that a lightweight simple compact and inexpensive cutting device for cheese and the like has been provided which will cut the last or the first slice with the same uniform thickness.

While several embodiments of this invention are described above, it will be understood, of course, that this invention is not to be limited thereto since many modifications may be made and it is contemplated therefore by the appended claims to cover any such modifications as fall within the true spirit and scope of this invention.

I claim:

1. In a device of the class above described, the combination of a holder comprising a base, a pair of parallel, vertically extending sides, a pair of guide members attached to said sides, said guide members having like tortuous slots cut therein, a cutting instrument comprising a frame engageable with said slots and a thin elongated blade tautly held by said frame.

2. In a device of the class above described, the combination of a holder comprising a base, a pair of parallel, vertically extending sides, a pair of guide members attached to the adjacent faces of said sides, each of said guide members having a tortuous slot cut therein, and a pair of positioning members angularly disposed between said parallel sides and attached thereto, and a cutting instrument, comprising a thin elongated blade, a handle therefor adapted to move between said guide members, and a pair of stud-like elements extending outwardly from said handle and cooperating with said tortuous slots.

3. In a device of the class above described, the combination of a holder comprising a base, a pair of parallel, vertically extending sides, a pair of guide members attached to the adjacent face of said sides, said guide members having like tortuous slots cut therein, a pair of parallel positioning members angularly disposed between said parallel sides and attached thereto, and a cutting instrument comprising a handle adapted to move between said guide members, a wire-like blade tautly held by said handle and a pair of stud-like elements extending outwardly from said handle and slidably engaging said tortuous slots.

4. In a device of the class above described the combination of a holder comprising a base, a pair of parallel, vertically extending sides, a pair of parallel positioning members angularly disposed between said parallel sides and attached thereto, and a pair of guide members attached to the adjacent faces of said slides, said guide members having corresponding tortuous slots cut therein, each of said slots comprising a plurality of horizontal, serially connected, parallel sections, spaced uniformly apart, and a cutting instrument comprising a thin elongated blade, a handle therefor adapted to move between said guide members, and laterally projecting studs on said handle and slidably engaging said tortuous slots.

5. In a device of the class above described the combination of a holder comprising a base, a pair of parallel, vertically extending sides, a pair of parallel positioning members angularly disposed between said parallel sides and attached thereto, and a pair of guide members attached to the adjacent faces of said sides, said guide members having corresponding tortuous slots cut therein, and a cutting instrument comprising a handle having spaced arms adapted to move between said guide members, a wire-like blade tautly held between the ends of the arms of said handle, and a pair of stud-like elements extending outwardly from the ends of said arms and adapted to slidably engage said tortuous slots.

6. In a device of the class above described the combination of a holder comprising a base, a pair of parallel, vertically extending sides, a pair of parallel positioning members angularly disposed between said parallel sides and attached thereto, and a pair of guide members attached to the adjacent faces of said sides, said guide members having corresponding tortuous slots cut therein, each of said slots comprising a plurality of horizontal, serially connected, parallel sections spaced uniformly apart and a vertical section joining the upper and lower parallel section together, a cutting instrument comprising a thin elongated blade, a handle therefor adapted to move between said guide members and a pair of stud-like elements extending outwardly from said handle and cooperating with said tortuous slots.

7. In a device of the class above described the combination of a holder comprising a base, a pair of parallel, vertically extending sides, a pair of parallel positioning members angularly disposed between said parallel sides and attached thereto, and a pair of guide members attached to the adjacent faces of said sides, said guide members having corresponding tortuous slots cut therein, each of said slots comprising a plurality of horizontal, serially connected, parallel sections spaced uniformly apart and a vertical section joining the uppermost and lowermost parallel sections together, a cutting instrument comprising a thin elongated blade, a handle therefor adapted to move between said guide members, and studs extending outwardly from said handle and slidably engaging said tortuous slots, said instrument, when said studs are positioned in said vertical sections of said slots, being adapted to be rotated to disengage said studs from said slots.

8. In a device of the class above described, the combination of a holder for a sliceable object comprising a base, two pairs of parallel, vertically extending sides having guide means attached thereto, each pair of opposing guide means having like tortuous slots cut therein, and a cutting instrument comprising a frame engageable with the slots of either of said pairs of guide means and a thin elongated blade angularly disposed with reference to said frame and attached thereto.

9. In a device of the class above described, the combination of a holder for a sliceable object comprising a base, two pairs of parallel vertically extending sides having guide means attached thereto, each pair of opposing guide means having like tortuous slots cut therein, each of said slots comprising a plurality of horizontal, serially connected, parallel sections spaced uniformly apart, and a cutting instrument comprising a substantially U-shaped frame engageable with either pair of opposing slots and a thin elongated blade angularly disposed with reference to said frame and attached thereto.

10. In a device of the class above described, the combination of a holder comprising a base, two pairs of parallel vertically extending sides having guide means attached thereto, each pair of opposing guide means having like tortuous slots therein, each of said slots comprising a plurality of horizontal, serially connected, parallel sections spaced uniformly apart, the spacing between said parallel sections of the slots of the two pairs of sides being different, and a cutting instrument comprising a frame engageable with either of said pairs of slots and a thin elongated blade angularly disposed with reference to said frame and attached thereto.

11. In a device of the class above described, the combination of a holder comprising a base, two pairs of parallel vertically extending sides having guide means attached thereto, each pair of opposing guide means having like tortuous slots therein, each of said slots comprising a plurality of horizontal, serially connected, parallel sections spaced uniformly apart, the spacing between said parallel sections of the slots of the two pairs of sides being different, and a cutting instrument comprising a handle adapted to move between said pair of guide means, a pair of stud-like elements extending outwardly from said handle and cooperating with said pair of tortuous slots, and a thin elongated blade angularly disposed with reference to said handle and attached thereto.

12. In a device of the class above described, the combination of a holder comprising a base, two pairs of parallel vertically extending sides having guide means attached thereto, each pair of opposing guide means having like tortuous slots cut therein, each of said slots comprising a plurality of horizontal, serially connected, parallel sections spaced uniformly apart, and a vertical section joining the uppermost and lowermost parallel sections together, the spacing between said serially connected parallel sections of the slots of the two pairs of sides being different, and a cutting instrument comprising a U-shaped handle adapted to move between said pair of guide means, a pair of stud-like elements extending outwardly from arms of said handle and adapted to slidably engage with either of said pairs of tortuous slots, and a thin elongated blade tautly held between said arms and angularly disposed with reference thereto.

13. In a device of the class described, the combination of a holder for a sliceable object, comprising a base and a pair of parallel vertically extending sides having a tortuous slot formed in but not extending through each of said sides, and a cutting instrument comprising a thin elongated blade and a frame therefor, said instrument slidably engaging said slots.

14. In a device of the class described, the combination of a holder for a sliceable object comprising a base and a pair of parallel vertically extending sides, the opposing surfaces of each of said sides having a tortuous slot formed therein but not extending therethrough, and a cutting instrument comprising a thin elongated blade and a slidable frame therefor disengageably mounted within said slots.

15. In a device of the class described, the combination of a holder for a sliceable object, comprising a base, a pair of parallel vertically extending sides, guide members mounted on the opposing surfaces of said sides, each of said guide members having a tortuous slot formed therein, and a cutting instrument, adapted to move between said guide members, comprising a thin elongated blade and a frame therefor being slidably engageable in said slots.

16. In a device of the class described, the combination of a holder for a sliceable object, comprising a base, a pair of parallel vertically extending sides, guide members detachably mounted on the opposing surfaces of said sides, each of said guide members having a tortuous slot formed therein, said slot comprising a plurality of serially connected, elongated sections parallel to said base and spaced uniformly apart, the uppermost and lowermost elongated section being joined by a connecting section, and a cutting instrument, adapted to move between said guide members, comprising a thin elongated blade and a frame therefor being slidably engageable in said slots.

17. In a device of the class described, the combination of a holder for a sliceable object, comprising a base and a pair of parallel vertically extending sides having tortuous slots of like configuration formed therein but not extending therethrough, said slots comprising a plurality of serially connected, elongated sections parallel to said base and having the uppermost and lowermost elongated section joined by a connecting section, and a cutting instrument comprising a thin elongated blade and a frame therefor being slidably engageable in said slots and detachable therefrom upon twisting of said frame when positioned in said connecting section.

18. In a device of the class described, the combination of a holder for a sliceable object, comprising a base, a pair of parallel vertically extending sides, and guide members mounted on the opposing surfaces of said sides, each of said guide members having a tortuous slot formed therein; a cutting instrument comprising a thin elongated blade, and a frame therefor slidably engaging said slots; and means disposed between said sides and obliquely with respect thereto, for retaining said object in a relatively fixed position while being sliced by said blade.

19. In a device of the class described, the combination of a holder for a sliceable, rectilinear, loaf-shaped object, comprising a base, a pair of parallel vertically extending sides, and guide members detachably mounted on the opposing surfaces of said sides, each of said guide members having a tortuous slot of like configuration formed therein; a cutting instrument, adapted to move between said guide members, comprising a thin elongated blade, and a frame therefor slidably engaging said slots; and a pair of spaced elongated elements mounted obliquely on said sides and extending across and above said base for retaining said object in a relatively fixed position while being sliced by said instrument.

HAROLD A. OLANDER.

REFERENCES CITED

The following references are of record in the file of this patent:

UNITED STATES PATENTS

| Number | Name | Date |
|---|---|---|
| 865,447 | Stewart | Sept. 10, 1907 |
| 1,705,257 | Lockett | Mar. 12, 1929 |
| 1,751,264 | Cross et al. | Mar. 18, 1930 |
| 1,796,212 | Nadeo | Mar. 10, 1931 |